United States Patent [19]

Kennedy

[11] Patent Number: 4,698,886
[45] Date of Patent: Oct. 13, 1987

[54] ECCENTRIC PLUG VALVE

[75] Inventor: Paul G. Kennedy, Horseheads, N.Y.

[73] Assignee: ITT Corporation, New York, N.Y.

[21] Appl. No.: 805,669

[22] Filed: Dec. 6, 1985

Related U.S. Application Data

[62] Division of Ser. No. 622,917, Jun. 21, 1984, abandoned.

[51] Int. Cl.$^4$ .............................................. B21K 1/20
[52] U.S. Cl. .......................... 29/156.7 R; 29/157.1 R;
29/527.6; 164/98
[58] Field of Search .................... 29/156.7 R, 157.1 R,
29/157.1 A, 527.6; 164/98; 251/309, 315, 317, 356

[56] References Cited

U.S. PATENT DOCUMENTS

| | | | |
|---|---|---|---|
| 2,290,177 | 7/1942 | Grant, Jr. ........................ | 251/356 X |
| 2,803,426 | 8/1957 | Zwik ................................ | 251/309 X |
| 3,211,421 | 10/1965 | Johnson et al. ................. | 251/317 X |
| 3,272,472 | 9/1966 | Goldman ......................... | 251/309 X |
| 3,398,925 | 8/1968 | Scaramucci ..................... | 251/317 X |
| 3,437,310 | 4/1969 | Inch .................................. | 251/317 |
| 3,626,498 | 12/1971 | Rihm ................................ | 251/317 X |
| 3,649,380 | 3/1972 | Tauschek ..................... | 29/156.7 R X |
| 3,920,036 | 11/1975 | Westenrieder .................. | 251/317 X |
| 4,015,818 | 4/1977 | Tawahol .......................... | 251/317 X |
| 4,113,228 | 9/1978 | Frye ................................. | 251/317 X |
| 4,233,490 | 11/1980 | Shalai et al. ................. | 277/189.5 X |
| 4,399,977 | 8/1983 | Wheatley ............................ | 251/315 |

FOREIGN PATENT DOCUMENTS

| | | | |
|---|---|---|---|
| 3418405 | 11/1984 | Fed. Rep. of Germany ........ | 164/98 |
| 2133330 | 7/1984 | United Kingdom .................. | 164/98 |

Primary Examiner—Timothy V. Eley
Attorney, Agent, or Firm—Menotti J. Lombardi

[57] ABSTRACT

An eccentric plug valve having a resilient annular ring seating surface surrounding the inlet to the valve and a metal ring, matching the resilient annular ring, embedded in the sealing face of the eccentrically mounted valve plug.

3 Claims, 5 Drawing Figures

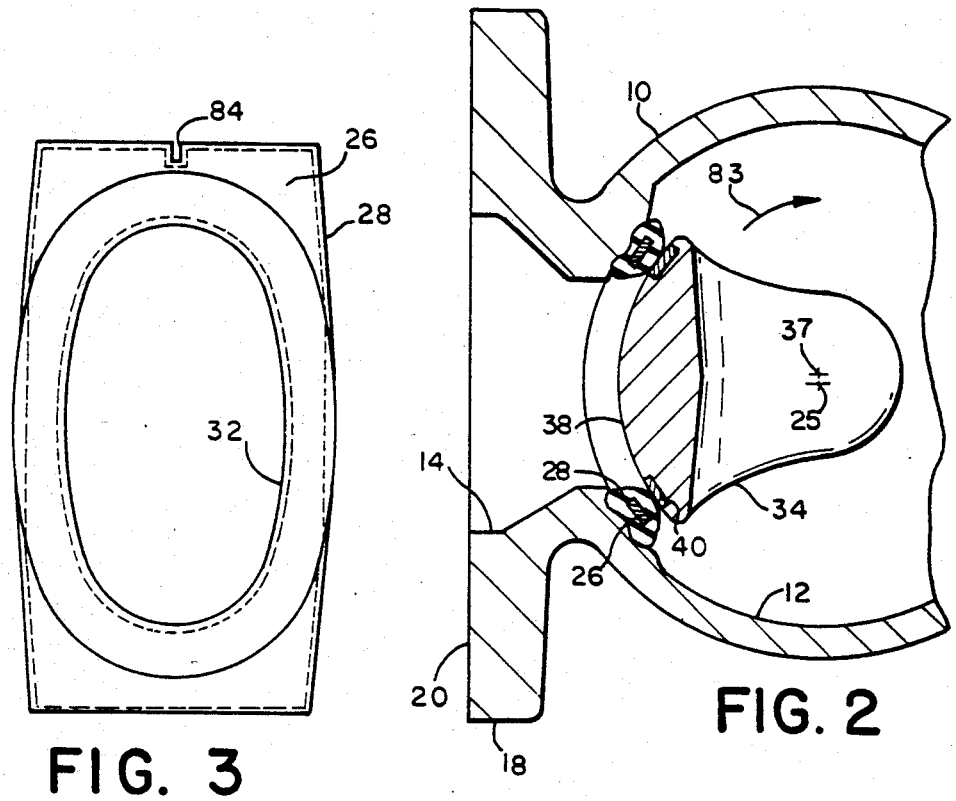
FIG. 3
FIG. 2
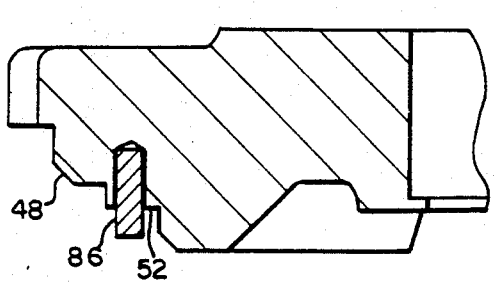
FIG. 4
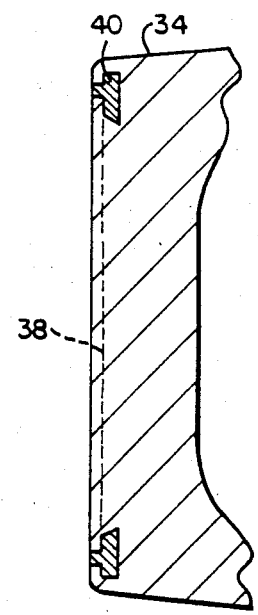
FIG. 5

ECCENTRIC PLUG VALVE

This application is a division of application Ser. No. 622,917 filed June 21, 1984, which is now abandoned.

TECHNICAL FIELD

The present invention relates, in general, to valves and, in particular, to a rotary eccentric plug valve.

BACKGROUND ART

Eccentric plug valves have been in use for a long time. U.S. Pat. No. 2,803,426 to De Zurek is typical of this class of valves. In such a valve, the valve chamber is cylindrical. The inlet to the valve chamber and the outlet from the valve chamber are transverse to the axis of the valve chamber. The valve plug is mounted for rotation in the valve chamber about an axis parallel to, but slightly offset from, the axis of the valve chamber. The offset of the axis of the valve plug from the axis of the valve chamber gives the eccentric plug its name.

The cylindrical sealing face on the valve plug mates with the seating surface of the valve chamber at the periphery of the inlet leading into the valve chamber to close the valve. The cooperation of the seating surface with the offset plug sealing face provides the advantageous feature of eccentric plug valves, namely, that as the plug rotates to seal the inlet, there is virtually no sliding contact between the seat in the valve chamber and the face on the plug.

In the most popular eccentric plug valves which are commercially available now, the sealing is effected by a rubber-encapsulated plug mating with a nickel seat ring welded into the wall of the valve chamber around the inlet to the valve chamber. When the rubber sealing surface of the plug wears, as may occur from the passage of solid substances and fluids through the valve when it is opened and from repeated opening and closing of the valve, the entire plug is replaced. This is relatively costly.

DISCLOSURE OF THE INVENTION

Accordingly, it is an objective of the present invention to provide a new and improved eccentric plug valve.

It is another objective of the present invention to provide an eccentric plug valve which is relatively simple in construction, reliable in operation, and inexpensive to repair.

These and other objectives are achieved by an eccentric plug valve, constructed in accordance with the present invention, in which the seal for closing the valve is formed by a resilient ring in the seating surface and a metallic sealing face on the plug. This is in contrast to the prior art valves in which the seal for closing the valve is formed by a metallic seating surface and a resilient sealing face on the plug.

Specifically, an eccentric plug valve, constructed in accordance with the present invention, includes a valve body having a cylindrical valve chamber, an inlet to the valve chamber, an outlet from the valve chamber, and a rubber-encased ring set into the wall of the valve chamber surrounding the inlet and forming a seating surface. This eccentric plug valve also includes a rotary valve plug disposed within the valve chamber and having a cylindrical sealing face containing a metal ring matching the rubber-encased ring set into the wall of the valve chamber. The cylindrical sealing face of the valve plug has a rotation axis parallel to and displaced from the axis of the valve chamber and about which the valve plug pivots to move the sealing face across the seating surface and bring the metal ring of the valve plug into registration with the rubber-encased ring in the valve chamber to close the valve.

BRIEF DESCRIPTION OF THE DRAWINGS

Referring to the drawings:

FIG. 2 is a partial horizontal section of an eccentric plug valve constructed in accordance with the present invention;

FIG. 3 shows the rubber-encased seating surface metallic insert of FIGS. 1 and 2;

FIG. 4 is a vertical section of a portion of the valve cap of FIGS. 1 and 2; and FIG. 5 is a vertical section of the sealing face of the valve plug of FIGS. 1 and 2 prior to its finished form.

BEST MODE FOR CARRYING OUT THE INVENTION

Figure 1:
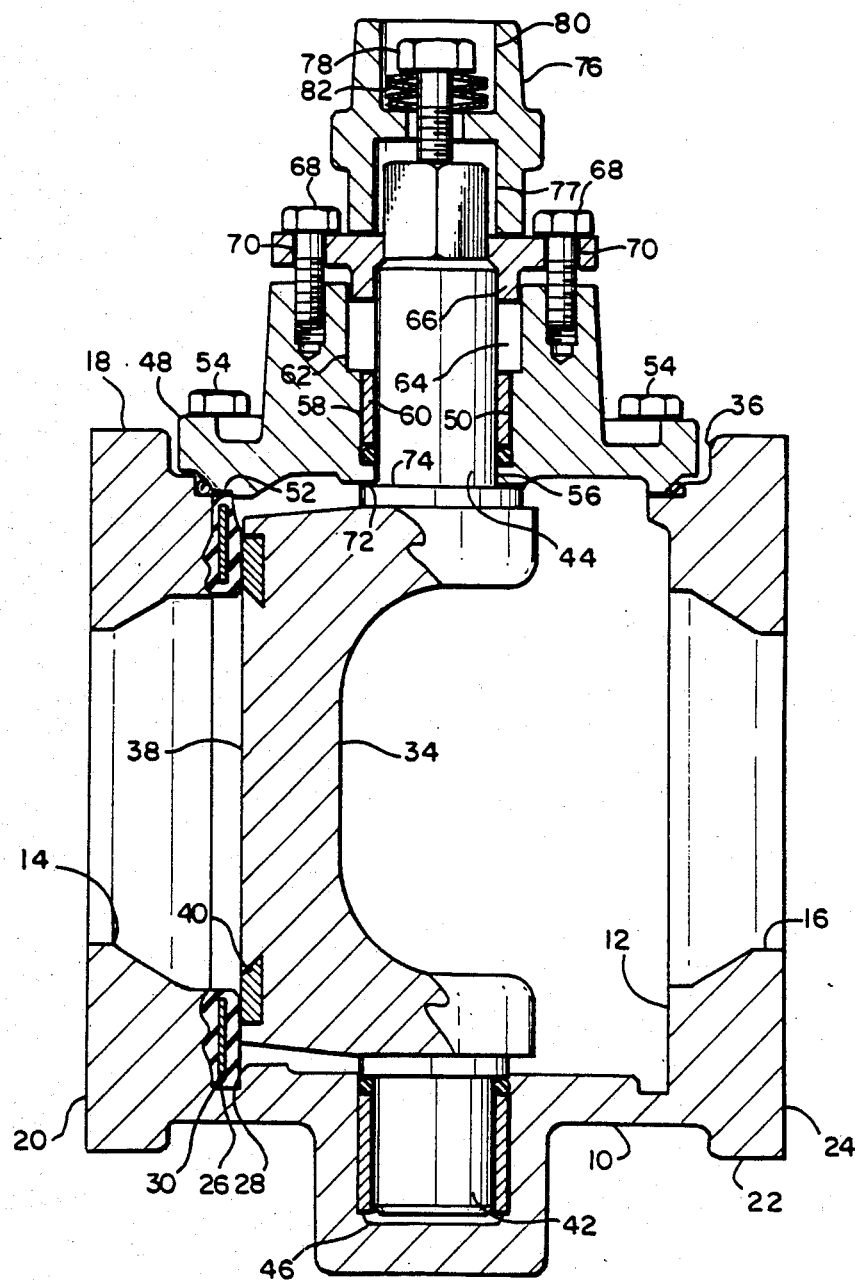
FIG. 1 is a vertical section of an eccentric plug valve constructed in accordance with the present invention.

Referring to FIGS. 1 and 2, an eccentric plug valve, constructed in accordance with the present invention, includes a valve body 10 having a cylindrical valve chamber 12, an inlet 14 into the valve chamber, and an outlet 16 from the valve chamber. Valve body 10 preferably is a cast iron part. Although shown as a single cast part, valve body 10 may be composed of two parts, with one forming the cylindrical valve chamber but having an opening at the bottom and the second being a bottom cap closing off the opening and secured to the first part by suitable means, such as bolts.

Inlet 14 of valve body 10 extends through a flange section 18 which forms a face plate 20 and outlet 16 of valve body 10 extends through a flange section 22 which forms a face plate 24. Inlet 14 and outlet 16 are aligned along a common axis which extends transverse to axis 25 of valve chamber 12. Suitable means, not shown but well known to those skilled in the art, may be used to place valve body 10 in a line by attachment of the upstream section of the line to flange section 18 and the downstream section of the line to flange section 22.

Valve body 10 also includes a metallic insert 26 encased in a rubber casing 28. The assembly of insert 26 and its rubber casing 28 is set into the wall of valve chamber 12 and forms an annular seating surface surrounding inlet 14. FIG. 3 shows additional details of the rubber-encased seating surface ring. Insert 26 and its rubber casing 28 are positioned in valve chamber 12 with the bottom edge of the rubber encased insert fitted in a channel 30 at the bottom of the valve chamber, so that an opening 32 in the ring surrounds inlet 14.

An eccentric plug valve, constructed in accordance with the present invention, also includes a rotary valve plug 34 disposed within valve chamber 12. Valve plug 34 is "C"-shaped in vertical cross-section. It is placed in valve chamber 12 through an opening 36 at the top of the valve chamber.

Valve plug 34 is mounted for rotation in valve chamber 12 about an axis 37 which is parallel to, but slightly displaced from, axis 25 of the valve chamber. This is shown in FIG. 2.

Valve plug 34 has a cylindrical sealing face 38 formed by the vertical portion of the "C" which extends parallel to rotation axis 37. Sealing face 38 contains a metal ring 40 embedded in the valve plug with the exposed face of the metal ring flush with the remainder of the sealing face. Metal ring 40 is preferably a corrosion-resistant material, such as a nickel alloy, and will be considered in greater detail below in connection with FIG. 5. For the moment, it will be sufficient to indicate that metal ring 40 matches the annular seating surface ring set into the wall of valve chamber 12, so that upon rotation of valve plug 34, ring 40 is brought into registration with the seating surface ring.

Valve plug 34 has a trunnion stem 42 at its bottom and a main stem 44 at its top. Trunnion stem 42 is journalled in a hole 46 in the bottom of valve body 10.

Opening 36 at the top of valve chamber 12 is closed off by a valve cap 48. After the seating surface ring is passed through opening 36 and valve plug 34 is placed in valve chamber 12, with trunnion stem 42 of the valve plug journalled in blind hole 46 of the valve body, valve cap 48, having a bore 50, is placed over the valve plug with main stem 44 of the valve plug extending through bore 50. In addition, the top edge of the seating surface ring is fitted in a channel 52 in valve cap 48. Bolts 54 serve to draw valve cap 48 downward to seat the valve cap in opening 36 and force the seating surface ring into place. An adhesive sealant can be used between the seating surface ring and valve body 10 to aid in sealing the unit.

Bore 50, at its bottom, has a first portion 56 that allows passage of main stem 44. Just above this first portion of the bore is a second portion 58 having a larger diameter which accepts a journal bearing 60 that takes the bearing load of main stem 44. Lastly, a third portion 62, having an even larger diameter, has stem packing 64 which prevents fluid leakage along the stem.

A packing gland 66 is forced axially against packing 64 by a pair of bolts 68 received by valve cap 48 through a pair of clearance holes 70 in the packing gland. A face seal 72, located between a shoulder 74 on the top of valve plug 34 and the inside of valve cap 48, also prevents fluid leakage along main stem 44. Face seal 72 also acts as a thrust bearing.

A crown 76 having a recess 77 corresponding in cross-section to the cross-section of the top of main stem 44, is fitted over the top of the main stem and is attached to valve plug 34 by means of a bolt 78 threaded into the end of the main stem. Disposed between the bearing surface of bolt 78 and the base surface of another recess 80 in crown 76 is a series of spring washers 82. As bolt 78 is tightened, it draws shoulder 74 on the top of valve plug 34 against face seal 72, with spring washers 82 maintaining the proper tension. Because the bottom of crown 76 bears against packing gland 66, spring washers 82 also maintain axial pressure on packing 64.

Actuation of the plug valve may be effected by a wrench or other suitable tool sized to engage crown 76. As crown 76 and main stem 44 are wrenched to turn valve plug 34 from the closed position shown in FIGS. 1 and 2 in the direction of arrow 83 in FIG. 2, the valve opens and fluid passes from inlet 14 through valve chamber 12 to outlet 16. Because valve plug 34 is C-shaped, it presents little, if any, obstruction to fluid flow through the valve.

As shown in FIG. 3, the assembly of ring 26 and its rubber casing 28 is formed with a vertical slot 84 in its top edge. Slot 84 cooperates with a pin 86 carried in channel 52 of valve cap 48 as shown in FIG. 4. As valve cap 48 is tightened down by bolts 54, pin 86 enters slot 84. The engagement of pin 86 in slot 84 serves to oppose movement of the seating ring along the wall of valve chamber 12 as valve plug 34 is moved between the open and closed positions.

Ring 40 may be cast in sealing face 38 of valve plug 34 in the following way. The ring, with relatively small pips on its outside surface, is placed in a mold with the pips down to space the ring away from the bottom surface of the mold. Radial arms are used to hold the ring steady as molten iron is poured into the mold to form the valve plug. With the molten iron at a temperature of, for example, approximately 2500° F., which is approximately the melting temperature of a typical nickel alloy which may be used, the surface of the ring, when contacted by the molten iron, approaches its melting point. As a result, carbon from the iron diffuses into the nickel ring and molten metal from the ring diffuses into the iron to "weld" the ring to the iron. FIG. 5 shows, in section, ring 40 cast in valve plug 34 just below the surface of the valve plug. After the valve plug has cooled, the surface is machined to expose ring 40 and sealing face 38, as shown in FIGS. 1 and 2, is formed.

The procedure just described for forming valve plug 34 provides a number of important features. First, holding ring 40 away from the mold surface during casting retards the chilling effect the cold ring might otherwise have on the molten iron. The first part of the ring contacted by the molten iron, as it fills the mold from the bottom, will be the face of the ring that is eventually exposed by machining. Any lack of fusion caused by quenching, generally, will be limited to this face. By the time the molten iron reaches the other surfaces of the ring, the ring will have been heated and will not "quench" the molten iron.

Also, "suspending" the ring in the mold spaces it from the skin or crust that forms on any cast part by the quenching effect of the mold. This also aids in forming a good bond between the ring and iron.

Thirdly, as the ring and the iron cool, the ring contracts more than the iron, which creates pressure around the inner periphery of the ring. This inward pressure helps the fusion of the ring and the iron. By shaping ring 40 with a bevel on its inner periphery which extends toward the center of the ring, the inward pressure during contraction of the ring aids the fusion of the ring and the iron at the inside face of the ring. In addition, the bevel converts the inward pressure into a force having a component that maintains the ring in the face of the valve plug.

A valve plug, constructed in accordance with the present invention to have an all-metal sealing face composed mainly of iron within which the ring is embedded, presents a stronger and more wear-resistant surface to the contents of a line connected to the inlet of the valve and to repeated opening and closing of the valve than prior art valves having a resilient sealing face. Moreover, if the resilient annular seating surface, set in the wall of the valve chamber, must be replaced, the replacement part is considerably less expensive than an entirely new valve plug which is the current practice with similar valves.

While in the foregoing there has been described a preferred embodiment of the present invention, it should be understood to those skilled in the art that various modifications and changes can be made without departing from the true spirit and scope of the invention as recited in the claims.

What is claimed is:

1. A method of fabricating a rotary valve plug having a sealing face for moving across a sealing surface comprising the steps of:

placing a metal ring having a small pips on one surface thereof in a mold with said small pips against the bottom of said mold to space said metal ring from the bottom of said mold;

pouring molten iron having a temperature approximately corresponding to the melting temperature of said metal ring into said mold and around said metal ring to cast said valve plug with said metal ring cast within a surface of said valve plug;

cooling said casting;

and machining said surface of said casting to remove said small pips and expose said metal ring within said surface to form the sealing face of said valve plug.

2. a method according to claim 1 wherein said metal ring is a nickel alloy.

3. A method according to claim 2 wherein said molten iron is at a temperature of approximately the melting temperature of said nickel alloy ring when poured into said mold.

* * * * *